Aug. 13, 1935. H. W. HARMAN 2,011,484
METHOD FOR REPAIRING CASTINGS
Filed Sept. 4, 1934
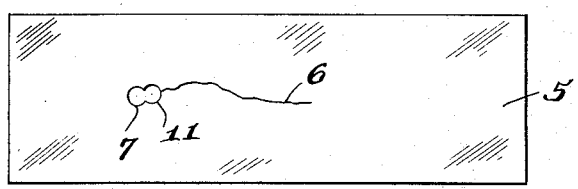
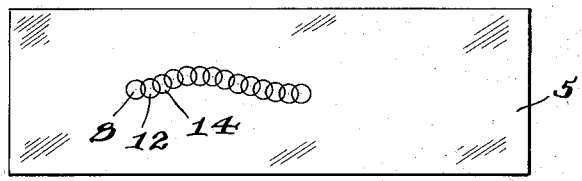
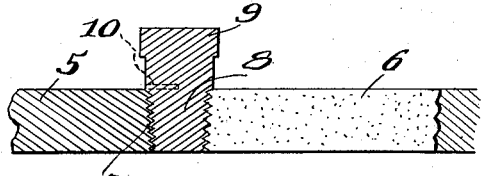
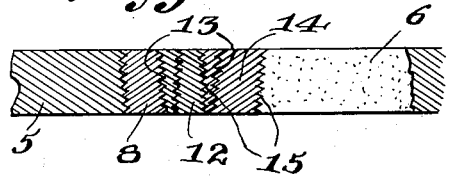
Inventor
Hal W. Harman
By Wilkinson + Mawhinney
Attorneys Patented Aug. 13, 1935

2,011,484

UNITED STATES PATENT OFFICE 2,011,484

METHOD FOR REPAIRING CASTINGS

Hal W. Harman, El Paso, Tex.

Application September 4, 1934, Serial No. 742,655

5 Claims. (Cl. 29—156.4)

The present invention relates to improvements in methods for repairing castings, and more particularly refers to an improved method and device for repairing breaks in castings such as cylinder blocs of internal combustion engines.

While the method of the invention will be found of more general application, the same is especially useful in treating and repairing breaks that are internal, such as in connection with a cylinder bloc being cracked from the valve seat to the cylinder bore. Such breaks as this cause a great deal of trouble when welded, as it is necessary to preheat the entire cylinder bloc before the same can be welded.

Such preheating results in more or less distortion in the casting which calls for more machine work for truing the casting after it is welded. This preheating method is also objectionable because of the labor of removing and reinstalling the bloc on the engine, and in a great majority of cases the weld will crack shortly after the repaired casting is put back into service.

It is an object of the present invention to do away with the above difficulties and to enable the repair of such breaks without requiring the removing of the cylinder bloc from the engine.

Another object of the invention is to accomplish the repair without the use of any heat whatsoever.

A further object of the invention is to provide an improved method and device which will effect a satisfactory, permanent and economical repair, which will withstand the expansion and contraction of the casting even better than the original metal of that casting.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a plan view of a casting showing a break therein and indicating the initial steps in the improved method of repair according to the present invention.

Figure 2 shows the fully repaired casting.

Figure 3 is a section taken through the ruptured casting showing the initial repair bolt in place, and Figure 4 is a similar view showing three of the bolts in place as they finally appear.

Referring more particularly to the drawing 5 designates a casting which has been cracked at 6. Such crack is usually repaired at the present time by welding the same.

In accordance with the present method a hole 7 is drilled at one end of the crack or break and the hole is subsequently filled by screwing thereinto a bolt, such as shown at 8 in Figure 3.

After drilling the hole 7 the same is threaded with a tap having a tapered thread, as indicated in Figure 3, in order to receive the screw threaded and tapered shank of the bolt 8. The bolt may originally have a head 9 for the purpose of taking a wrench or other instrument for the purpose of screwing the bolt 8 tightly into the hole 7. The head of the bolt is then sheared off along the line 10 so as to make same flush with the surface of the casting 5. Figure 4 shows the bolt in its final condition.

Thereupon a second hole 11 is drilled in the casting 5 along the line of the crack 6 adjacent to and overlapping the hole 7. In other words the drill removes parts of the casting at both sides of the crack 6 and also part of the bolt 8 previously installed in the hole 7. A tap is then inserted in this second hole 11 and the walls of the hole, including that portion extending into the initial bolt 8 are screw threaded with a tapered thread; and thereafter a second bolt 12 similar to the first is screwed into this hole 11 and cut off flush with the face of the casting and with that of the initial bolt 8.

Figure 4 shows the second bolt 12 and the tapered threaded shank 13 thereof. In a similar way a third hole is drilled and tapped into the casting in the line of the break 6, such hole being subsequently occupied by a bolt 14 which overlaps upon the second bolt 12. The threaded wall of the third bolt 14 is shown at 15 the same overlapping upon the second bolt 8.

In a similar manner other holes are drilled and tapped into the casting and are filled with bolts similar to the bolts 8, 12 and 14 until the end of the break 6 is reached or up to a point just beyond the break so as to avoid the spreading of such break.

I have discovered that a bolt, such as 8, 12 or 14, made of an alloy of iron and nickel, for example containing 64% iron and 36% nickel, which alloy is known as invar metal, possesses certain qualities which are very desirable in this connection. These qualities or characteristics are first, low co-efficiency of temperature, second the alloy is very tough, third it has a slightly higher melting temperature than cast iron, and fourth, it is very elastic and malleable.

Such nickel iron bolt will not expand and force the crack to open further, and, being an elastic metal, it is capable of absorbing the expansion and contraction of the casting without becoming loose; therefore, it will not break the chemical bond made by the copper sulphate solution between the bolt and the casting as hereinafter explained.

Now before placing any of the bolts in the casting, both the bolts and the holes are preferably treated with a solution of copper sulphate or copper chloride. This solution may be simply swabbed into the threaded walls of the holes 7, 8, etc., and the bolts may be dipped in the solution. Immediately the solution is applied the bolt is screwed into the hole in the casting and such bolt will thereupon become copper plated to the casting. Solutions other than copper, such as nickel sulphate can be used but the copper solution has been found the most satisfactory. The treatment by the solution is generally necessary in order to prevent the bolts from becoming loosened. The plating operation resulting from the application of the solution causes the bolts to become part of the casting.

After the break has been filled in the manner above described or simply with the bolts without applying the solution, the repair may be plated, in which case such repair is materially strengthened. The plating metal will also preferably be invar metal. Nickel and iron behave almost identically electro-chemically. Therefore an alloy of iron and nickel can be deposited electrochemically in practically the same proportion as that of the alloy.

For the plating process I preferably employ a solution of nickel and iron sulphate kept neutral or slightly alkaline. For best results the solution temperature should be kept at about 70° F. with a current density of 10 to 20 amp. per sq. ft. However, other solutions can be used.

I do not wish to limit myself to the exclusive use of a nickel iron bolt but so far this particular bolt has proven to be very satisfactory in practice.

What is claimed is:—

1. The herein described method for repairing breaks in castings, which consists in drilling a hole in the casting at or near one end of the crack, threading such hole, applying a plating solution to the walls of the hole, threading a bolt likewise treated with a plating solution into said hole, cutting off the bolt flush with the casting, drilling and threading a second hole in the casting overlapping the first hole and said first mentioned bolt, treating the walls of the second hole with a plating solution, screwing a second bolt into said hole whose walls have been first treated with a plating solution, cutting off the head of the second bolt flush with the casting, and drilling and tapping subsequent holes and applying subsequent bolts in the same manner to the end of the crack.

2. The herein described method for repairing breaks in castings, which consists in drilling a hole in a casting in line with the crack therein, screw threading the hole with a tapered thread, applying a plating solution to the tapered threaded wall of the hole, screwing a tapered bolt previously treated with plating solution into the hole, cutting off the bolt substantially flush with the face of the casting, drilling a second hole in the casting in line with the crack and overlapping the first hole and the bolt occupying same, tapping such second hole with a tapered thread, applying to the tapered threaded wall of the second hole a plating solution, screwing a second bolt previously treated with plating solution into the second hole, cutting off the second bolt substantially flush with the face of the casting, and drilling and tapping other holes and applying further bolts in the same manner to the end of the break in the casting.

3. The herein described method for repairing breaks in castings, which consists in drilling a hole in the casting through a portion of the crack, applying plating solution to the wall of the hole, inserting a bolt previously treated with plating solution into the hole, drilling a second hole in the casting through the crack and partially overlapping the first hole and bolt, applying plating solution to the walls of the second hole, inserting a bolt immediately after treating same with plating solution into the second hole, and drilling further holes and installing further bolts in substantially the same manner to the end of the crack.

4. The herein described method for repairing breaks in castings, which consists in drilling and tapping a hole through the casting and through the crack, applying plating solution to the walls of the hole, screwing a bolt into such hole immediately after applying the solution to the walls of the hole, drilling and tapping a second hole through the casting and crack overlapping the first hole and bolt therein, applying a plating solution to the walls of the second hole, screwing a second bolt into the second hole, and drilling and tapping further holes and installing further bolts in the same manner to the end of the crack.

5. The herein described method for repairing breaks in castings, which consists in drilling and screw threading a hole through the crack in the casting, screwing a bolt into the hole, drilling and screw threading a second hole through the crack in the casting adjacent and overlapping said first hole, screwing a second bolt into the second hole, forming other holes and screwing other bolts into such holes in the same manner to the end of the crack in the casting, and thereafter subjecting the cracked area, including the adjacent parts of the casting and installed bolts to an electro-plating action.

HAL W. HARMAN.